United States Patent
Lakshmi et al.

(10) Patent No.: US 11,176,025 B2
(45) Date of Patent: *Nov. 16, 2021

(54) FRAMEWORK FOR AUTOMATED EXECUTION OF TEST SCENARIOS, SUCH AS FOR USE IN TESTING WIRELESS NETWORK COMPONENTS

(71) Applicant: T-Mobile USA, Inc., Bellevue, WA (US)

(72) Inventors: Bharath Reddy Medarametla Lakshmi, Bellevue, WA (US); Komal Mehta, Kirkland, WA (US); Phaneendra Maseedu, Everett, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/024,542

(22) Filed: Sep. 17, 2020

(65) Prior Publication Data
US 2021/0081307 A1    Mar. 18, 2021

Related U.S. Application Data

(63) Continuation of application No. 16/569,518, filed on Sep. 12, 2019, now Pat. No. 10,846,208.

(51) Int. Cl.
*G06F 9/44* (2018.01)
*G06F 11/36* (2006.01)
*H04M 15/00* (2006.01)

(52) U.S. Cl.
CPC ...... *G06F 11/3684* (2013.01); *G06F 11/3688* (2013.01); *G06F 11/3692* (2013.01); *H04M 15/66* (2013.01)

(58) Field of Classification Search
None
See application file for complete search history.

(56) References Cited

U.S. PATENT DOCUMENTS

| | | | |
|---|---|---|---|
| 6,031,990 | A | 2/2000 | Sivakumar et al. |
| 6,219,829 | B1 | 4/2001 | Sivakumar et al. |
| 7,415,635 | B1 | 8/2008 | Annangi |
| 7,631,227 | B2 | 12/2009 | Poisson et al. |
| 7,685,472 | B1 | 3/2010 | Shibl et al. |
| 7,694,181 | B2 | 4/2010 | Noller et al. |
| 8,230,267 | B2 | 7/2012 | Noller et al. |

(Continued)

OTHER PUBLICATIONS

HP invent, "Seagull—Open Source tool for IMS testing," May 2006, 7 pages.

(Continued)

*Primary Examiner* — Anna C Deng
(74) *Attorney, Agent, or Firm* — Perkins Coie LLP

(57) ABSTRACT

A system and method for automating test scenarios for a component or entity of a network, including defining a test case that includes multiple values for multiple parameters and generating at least one test scenario based on the test case. Test scenarios can utilize the same traffic generator files and share data files to automate test execution. The system and method can further include executing a test scenario to obtain a test result that indicates whether the component or entity of the network passed or failed the test scenario.

20 Claims, 6 Drawing Sheets

(56) References Cited

U.S. PATENT DOCUMENTS

| | | |
|---|---|---|
| 8,522,211 B2 | 8/2013 | Arcese et al. |
| 8,527,813 B2 | 9/2013 | Budnik et al. |
| 8,850,400 B2 | 9/2014 | Shrivastava et al. |
| 8,892,953 B2 | 11/2014 | Frohlich et al. |
| 8,893,087 B2 | 11/2014 | Maddela |
| 8,924,933 B2 | 12/2014 | Doshi et al. |
| 9,047,414 B1 | 6/2015 | Matyjek |
| 9,053,240 B2 | 6/2015 | Arcese et al. |
| 9,135,150 B2 | 9/2015 | Rumble |
| 9,329,983 B2 | 5/2016 | Arcese et al. |
| 9,477,583 B2 | 10/2016 | Maddela |
| 9,606,903 B2 | 3/2017 | Murugesan |
| 9,886,375 B2 | 2/2018 | Rumble |
| 2014/0139034 A1* | 5/2014 | Sankar ................. H02J 50/402 307/104 |
| 2014/0292384 A1* | 10/2014 | Wu ................. G05B 19/0423 327/143 |
| 2016/0080243 A1* | 3/2016 | Kodama ............... G06F 11/263 370/252 |
| 2016/0274870 A1* | 9/2016 | Seidman ................. G06F 8/35 |
| 2018/0242834 A1* | 8/2018 | Hetling ................ A61B 3/0008 |

OTHER PUBLICATIONS

HP OpenCall Software, "Seagull: an Open Source Multi-protocol traffic generator," 2006, 3 pages.

\* cited by examiner

FRAMEWORK FOR AUTOMATED EXECUTION OF TEST SCENARIOS, SUCH AS FOR USE IN TESTING WIRELESS NETWORK COMPONENTS

CROSS REFERENCE TO RELATED APPLICATIONS

This application is a continuation of the assignee's U.S. patent application Ser. No. 16/569,518 filed Sep. 12, 2019, entitled AUTOMATION FRAMEWORK WITH ORCHESTRATED TEST EXECUTION, SUCH AS FOR USE IN TESTING WIRELESS NETWORK COMPONENTS, which is hereby incorporated by reference in its entirety.

BACKGROUND

The telecommunications industry continues to experience ongoing changes and upgrades in technology to support user demands. As telecommunications networks change, service providers face challenges to maintain high quality user experiences while ensuring that existing offerings are not impacted. The Evolved Packet Core (EPC) provides an architecture for messaging, authentication, and mobility for various data services. The IP multimedia subsystem (IMS) architecture delivers communication services using the Internet Protocol (IP). The IMS is independent of the EPC but can utilize the EPC to provide voice services. Supporting user demands on these architectures requires testing what is delivered to users. While equipment vendors and network operators focus on developing platforms and services to improve user experiences, testing those solutions is challenging. For example, telecommunications protocols are open and rapidly changing, which makes timely and cost-effective testing difficult. In addition, testing legacy (SS7) protocols is necessary but exacerbates the challenges. Hence, easing testing would enable rapid deployment with greater confidence and thus greater revenue streams for service providers.

Service providers and equipment makers have developed test methodologies for security, performance, and/or reliability. For example, a manual testing procedure involves hardcoding an environment to simulate a combination of hardware and software components. The success or failure of a test is determined based on whether the actual outputs match the expected outputs based on known inputs. Test automation helps minimize the guess work and human error and frees up resources to focus on scenarios that require manual intervention. Current services automate planning such as tool selection and script development for various equipment and network interfaces. These techniques require developing code for each individual test scenario. As such, comprehensive testing requires developing separate scripts to test different nodes and different types of network components. This form of automation remains time consuming and burdensome because a programmer needs to manually hardcode each test scenario for different network entities.

BRIEF DESCRIPTION OF THE DRAWINGS

Embodiments of the present technology will be described and explained through the use of the accompanying drawings.

Figure 1:
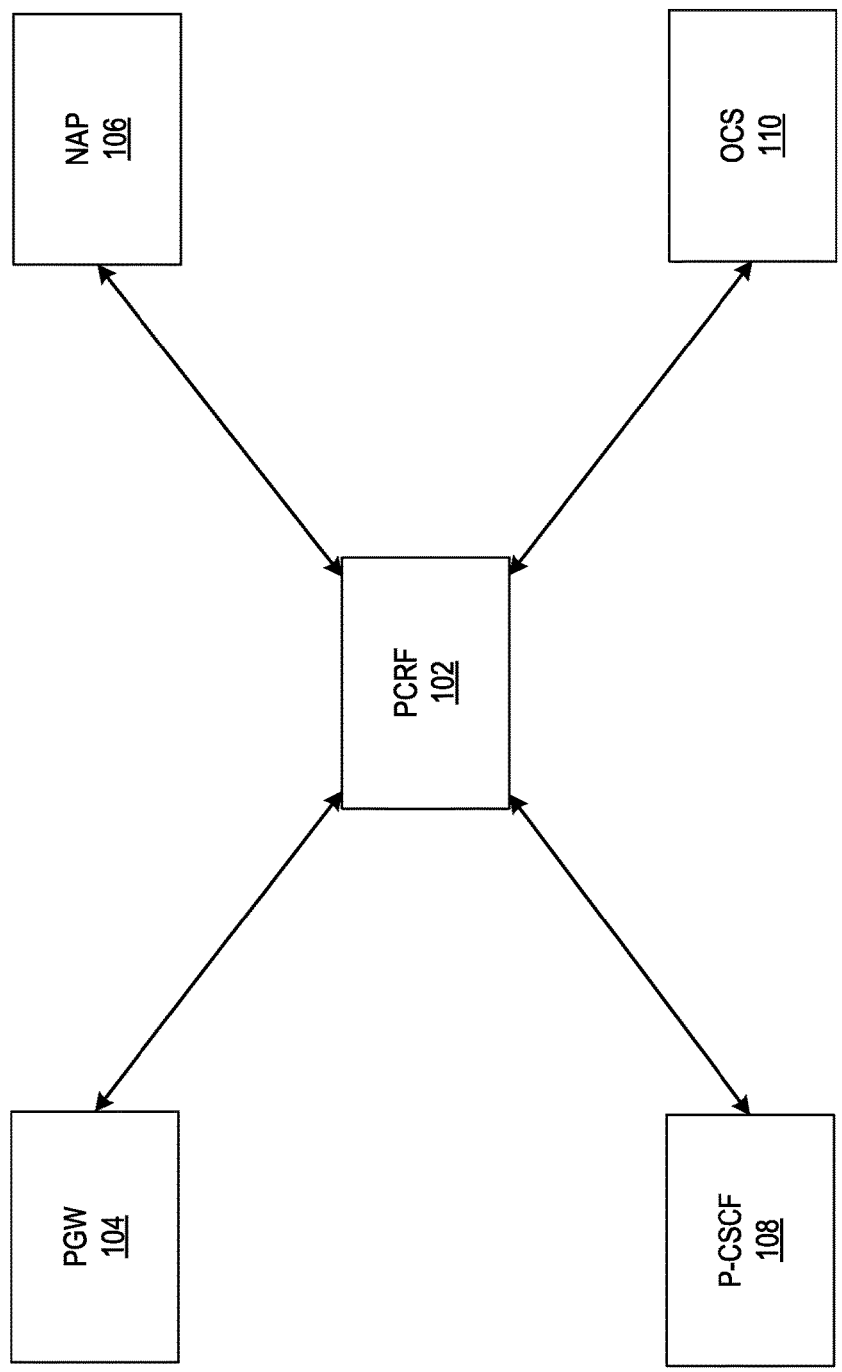
FIG. 1 is a block diagram that illustrates a policy and charging rules function (PCRF) that connects to other nodes of a telecommunications network.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed systems and methods relate to an automation framework for performing various test scenarios by developing a test framework for a test case and reusing at least some features of the test case to derive test scenarios. The framework includes logic that coordinates the execution of actions that can trigger before, during, or after a test scenario execution and enables user-defined pass/fail criteria. Any number of alternative test scenarios are based on the original test case by reusing some of the original test data files to specify each alternative test scenario.

The disclosed framework-level solution automates execution for multiple test scenarios unlike prior individual test-level solutions. To automate test execution, the framework specifies variables for a test case environment and provides an option to override global variables for each test scenario. The test environment can require different pre-conditions for provisioning events or script executions that adapt the environment for each test scenario. The framework can identify when to trigger an action and then dynamically trigger the action. Examples of trigger events include a network access point (NAP) provisioning event, lightweight directory access protocol (LDAP) event, secure shell (SSH) command event, or a simple object access protocol (SOAP) request event. The framework can define pass/fail criteria for each individual test scenario, identify a sequence of messages to expect during test execution, and define various verification rules.

To aid in understanding, this disclosure generally describes embodiments for testing a policy and charging rules function (PCRF) of a telecommunications network. However, a skilled person would understand that the described concepts are applicable to other network components or entities. Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

FIG. 1 is a block diagram that illustrates a PCRF connected to nodes of a network 100. The PCRF 102 is a Long Term Evolution (LTE) EPC function/component that can undergo testing with the automation framework. In operation, the PCRF 102 determines policy rules in a network that can access subscriber databases and other specialized functions such as an online charging system. The PCRF 102 can aggregate information to and from the network, operational support systems, and other sources (e.g., from portals) in real-time, to support the creation of rules and then automatically makes policy decisions for each active subscriber on the network. Embodiments of the network 100 can include other components not shown herein for the sake of brevity or omit some components.

As shown, the PCRF 102 is coupled to a packet data network gateway (PGW) 104, a network access point (NAP) 106, the proxy call session control function (P-CSCF) 108, and an online charging system (OCS) 110. In operation, the Gx interface of the PGW 104 uses Diameter protocol to communicate with the PCRF 102 to handle policy and charging rules (PCC). The PCC rules contain charging related information as well as quality of service (QoS) parameters that are used in the bearer establishment. The NAP 106 is a provisioning management platform that creates provisioning for and notifies multiple network entities. The NAP 106 can translate activation and provisioning data from IT systems into network entity specific provisioning information. The P-CSCF 108 functions as a proxy server for the user devices. That is, all session initiation protocol (SIP) signaling traffic to and from the user equipment must go through the P-CSCF 108. The OCS 110 is a system allowing a communications service provider to charge customers in real-time, based on service usage. Collectively, the components of the network 100 supports service data flow detection, policy enforcement, and flow-based charging.

The PCRF 102 is tested under different scenarios because of varying combinations of network configurations and ongoing technology changes. For example, a subscriber to a service of the network 100 may choose to add a feature to a current subscription. The feature is added during the user's active session so that the user has a seamless experience without needing to shut down or restart the user device or any other device of the network 100. Hence, the change to the subscription plan happens instantaneously while the user's session is active.

The service provider seeks to test this type of change in the network 100 before actually deploying the change in real life. A conventional test case is hardcoded to only test one scenario that reflects a particular combination of variables. For example, a scenario can include a particular access point name (APN), a particular user device, and a particular geographic location of the user device. Testing different combinations in scenarios requires a separate test for each scenario. Each test scenario requires provisioning a combination of each resource for the PCRF 102. For example, a test scenario requires provisioning the NAP 106 and the OCS 110. Any traffic flow through the network 100 depends on the different combinations of a scenario during the traffic flow. For example, the scenarios can include different combinations of 10 APNs, 10 use devices, and 5 locations. In prior systems, a programmer must develop a separate test for each combination. As such, the manual testing of existing techniques is complex and burdensome.

Figure 2:
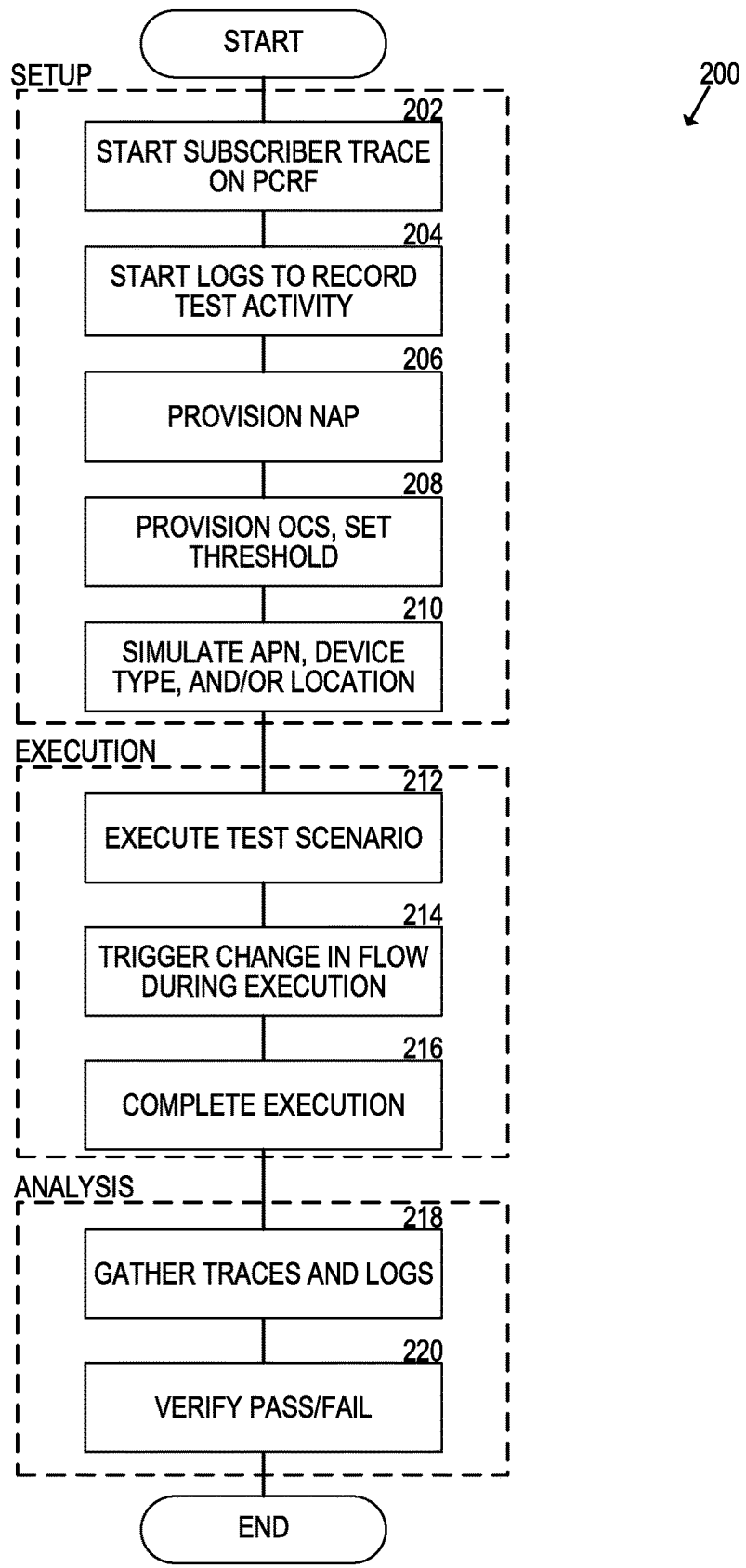
FIG. 2 is a flowchart that shows a hardcoded sequence for a test scenario.

FIG. 2 is a flowchart that shows a hardcoded test sequence 200 for a particular test scenario. At least some aspects of the sequence 200 can be performed manually. The sequence 200 can be divided into three stages for a test scenario: setup, execute, and analyze. The setup stage involves setting conditions required before executing a test. The execution stage involves actions executed to complete a test scenario. The analysis stage involves determining whether the test scenario passed or failed a test scenario.

The setup stage begins in 202, where the test sequence starts a subscriber trace on a PCRF. In 204, log files start to record test-related activity. In 206, a NAP is provisioned for the subscriber. In 208, an OCS is provisioned for the subscriber including a threshold value for charging the subscriber. In 210, the hardcoded test sets a location, device type, and APN for a test scenario.

The execution stage begins in 212, where a test scenario is executed in accordance with the conditions defined at the setup stage. In 214, a change is triggered while the test is executing. For example, as described above, an example of the change is a subscriber-initiated change to a subscription plan. In 216, the test execution is completed.

The analysis stage begins in 218, where the test environment gathers trace and log data. In 218, it is determined whether the test scenario passed or failed. For example, pass/fail of the test can be verified by comparing the actual output to expected output as defined in the setup stage.

The sequence 200 must be performed for each combination that defines a scenario. For example, the sequence 200 must be performed once for each combination of 10 APNs, 10 user devices, and 5 locations. Accordingly, preparing 50 or more scenarios is not unusual because a single combination must be tested separately in accordance with the sequence 200. Conventional automation of this sequence merely requires developing separate hardcoded scenarios according to a development plan.

The disclosed embodiments can execute multiple tests scenarios based on a single automation framework. The automation framework has modular architecture that defines interactions with a node (e.g., PCRF node) for different test scenarios. For example, modular components can define how network components are provisioned relative to each other rather than merely defining values for variables of a single test scenario. In one example, the automation framework utilizes a traffic generator and uses YAML file definitions. YAML ("YAML Ain't Markup Language") is a data-oriented language structure that is commonly used for configuration files and targets many of the same communications applications as XML but has a minimal syntax.

Thus, the disclosed automation framework differs from prior solutions because the development is at a framework-level rather than individual test-level. The automation framework can replicate manual test methodologies by considering the actions that can be defined and triggered before/during/after a test execution process, and also enables custom pass/fail criteria for each test scenario. Once the automation framework has been developed, a user can create new test scenarios by reusing test data files and specify new criteria to determine the test scenario as successful.

Figure 3:
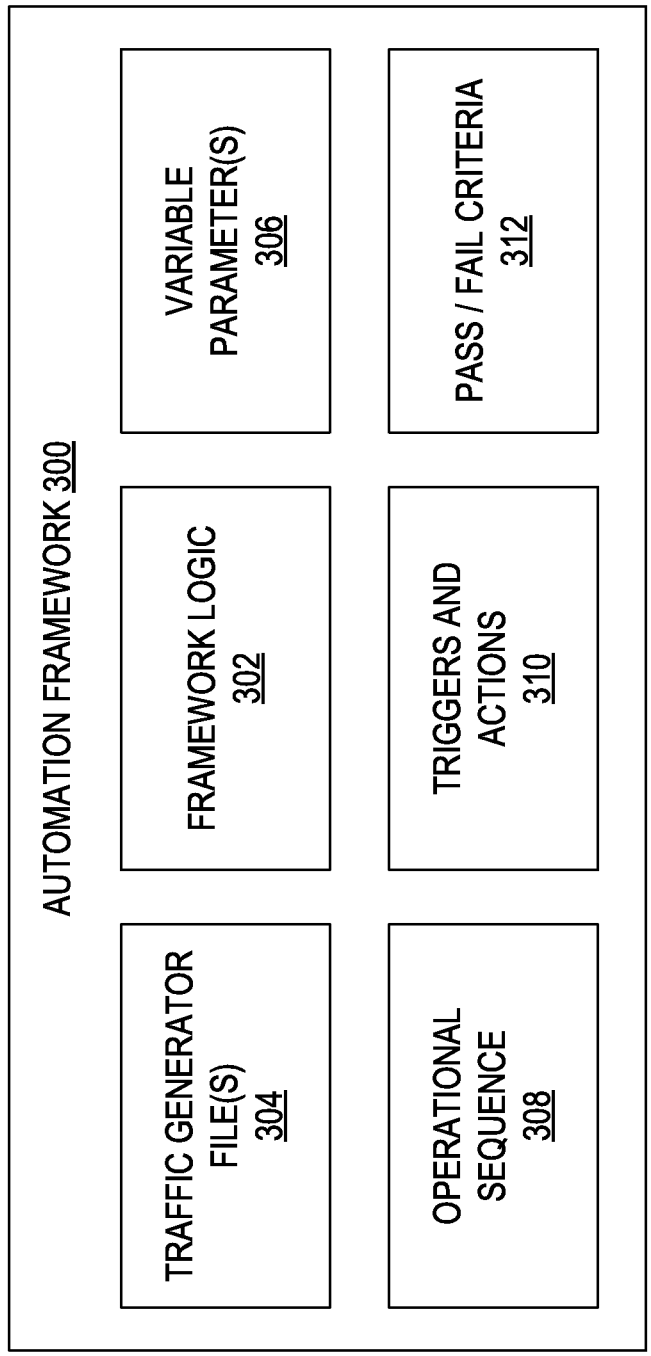
FIG. 3 is a block diagram that illustrates functional components of an automation framework.

FIG. 3 is a block diagram that illustrates functional components of an automation framework 300. The framework logic 302 can functionally mimic a manual execution process. As shown, the automation framework 300 further includes traffic generator file(s) 304, defines variables parameter(s) 306, defines an operational sequence 308, defines triggers and associated actions 310, and defines pass/fail criteria 312. As such, the automation framework 300 can create, execute, and verify test scenarios.

An example of traffic generator files 304 includes Seagull files, which are managed by the framework logic 302. Seagull is a non-limiting example of an open source multi-protocol traffic generator that is typically used for internet protocol (IP) multimedia subsystem (IMS) protocols. Spirent Landslide Diameter system is another example of a traffic generator. Seagull can generate traffic for functional, load, endurance, stress, and performance/benchmark tests for almost any kind of protocol. Seagull supports Diameter protocol (RFC 3588) for network entity interfaces (e.g., Gx, Gy, Sy, Rx, Cx, Dx, Ro, Rf, Sh over TCP or SCTP or TLS over IPv4 or IPv6). Specifically, Seagull utilizes user-configurable XML files to package Diameter messages for a test scenario. The user-configurable XML files allow for emulating any Diameter client and sending Diameter messages with any set of attribute-value pairs (AVPs) including vendor-specific AVPs Development of the automation framework can involve creating the Seagull file(s) and defining variables of the Seagull file(s). The XML configuration files can include a scenario file, a configuration file, and a protocol dictionary. Seagull executes the exact Diameter message sequence defined in the scenario file (e.g., start, send A, receive B, stop). The configuration file describes the network environment and traffic parameters. For example, the configuration file can describe the number of TCP connections, Diameter server IP and port, and message timeout values. The protocol dictionary defines the Diameter messages and AVP's that can be part of the scenario file. An example execution flow includes execution of the scenario file, configuration file, protocol dictionary, log debug file, and other files.

The variable parameters 306 are defined for an entire test case. The automation framework 300 provides an option to override global variables as needed for each individual test scenario. The automation framework 300 has a provisioning system that integrates with a simulator to generate Diameter protocol traffic. To setup a test environment, each test case requires different parameter values including, for example, provisioning events or script executions that will adapt a test environment for a test scenario. A test case is established with a set of variables and any subsequent test can reuse the test scenario with a different set of variables. The automation framework 300 can also aggregate variables of multiple tests or modify the original test case for different combinations of variable parameters.

The triggers and actions 310 identify when an action is triggered at a specific point in time and then dynamically trigger the action. An example of a trigger event is a textual keyword identified in a flow during a test execution. Other examples of trigger events include a NAP provisioning event, a LDAP based event, an SSH command event, a SOAP request event, etc. The pass/fail criteria can be defined for each individual test scenario. The operational sequence 308 defines a standard flow for test scenario(s). For example, the operational sequence 308 can include clear all data, provision in accordance with a subscription plan, start trace, execute test scenario, gather trace information.

The framework logic 302 can identify a sequence of messages to expect during test execution and manage verification rules (e.g., value equals, value contains, time difference calculation, check if any exist, check if all exist, check if a Diameter AVP is/not present, check if an integer value is in range). For example, in the context of a PCRF framework the framework logic 302 can utilize Seagull to emulate a packet data network gateway (PGW) (Gx) and proxy call state control function (P-CSCF) (Rx) interfaces in a test scenario. The framework logic 302 can manage Seagull scenarios, template parameters details, a Seagull run sequence, PCRF trace syntax, NAP/LSAP/SOAP/SSH conditions and global test case variables. The global definitions can include virtual machine (VM) details and a TCP dump. The Seagull scenario files are defined with custom messages or triggers to prepare scenario files and execution. Several different directories can be created to execute a test case.

Figure 4:
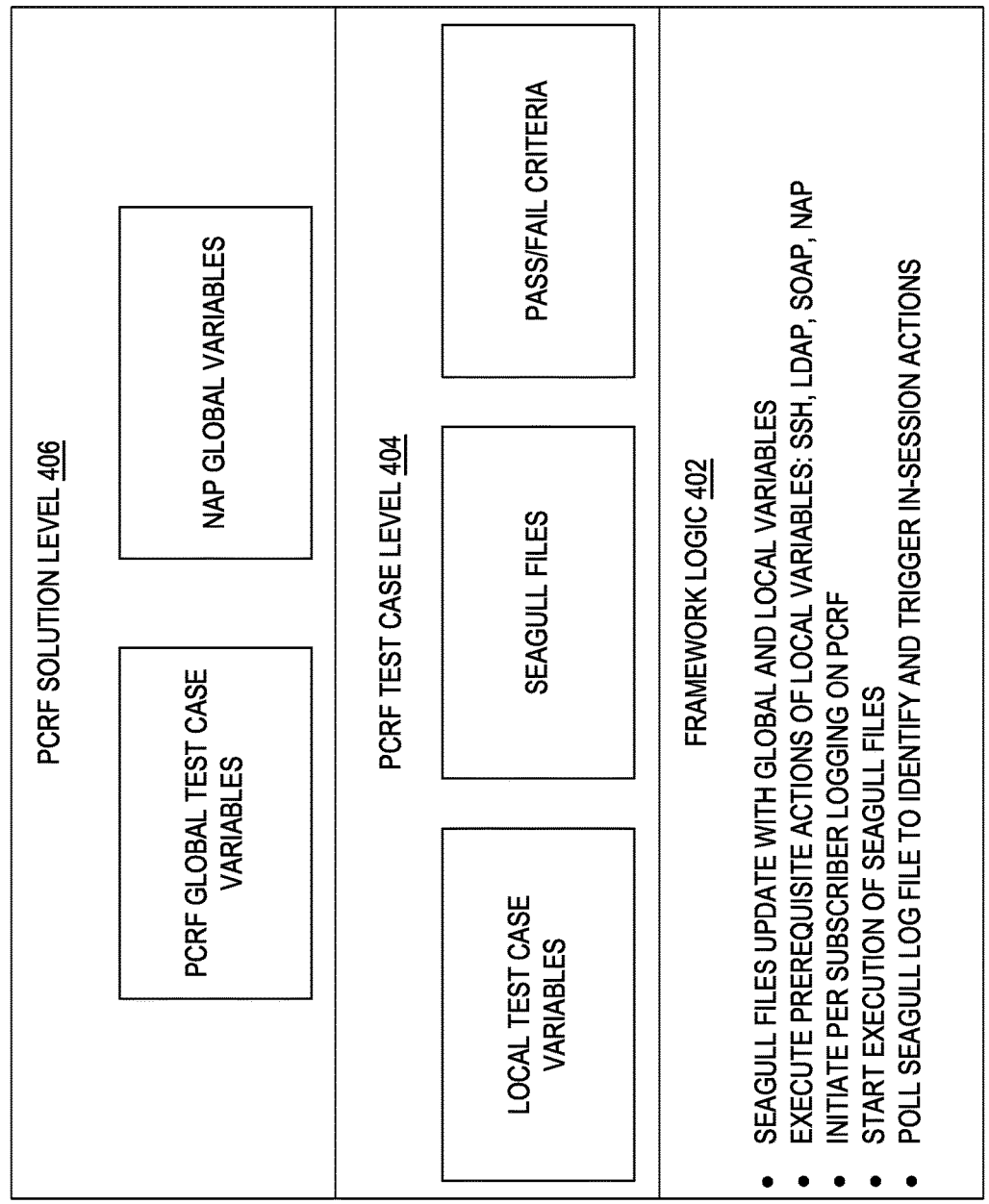
FIG. 4 is a block diagram that illustrates a hierarchical architecture of an automation framework.

FIG. 4 is a block diagram that illustrates a hierarchical architecture 400 of the automation framework. The framework logic 402 is at a base level and includes Seagull files with global and local variables to execute actions from local YAML: SSH, LDAP, SOAP, NAP. The framework logic 402 starts execution of the Seagull files, can poll the Seagull log files to identify and trigger session actions, and can initiate per subscriber logging on to an network entity (e.g., PCRF). The PCRF test case level 404 includes local test-case variables, the Seagull files, and pass/fail criteria. The PCRF solution level 406 includes PCRF global test-case variables and NAP global variables.

The automation framework for PCRF supports dynamic variables to differentiate between each test run, separate parallel test scenarios, and a random IP address for each test run. The automation framework also automates setup of NAP and OCS profile states before and during the test case execution by provisioning the test number with a specified plan and sets the counter value on the OCS to above threshold.

The automation framework allows execution of LDAP and SSH commands before and during the test case execution. For example, the LDAP commands can run to clear gpass and run show subs script when needed. As explained above, the automation framework allows for custom pass/fail criteria for Gx and Rx interfaces that can be updated dynamically overtime. The automation framework captures logs, packet capture (PCAP) information, session information and more for each test scenario. In particular, embodiments of the automation framework support validation conditions for Diameter AVPs including, for example:

Revalidation-Time: PCRF_EVAL_TIME_DIFF: 24, 40000;
Event-Trigger: "PCRF_EVAL_OR: 17, 29;
Event-Trigger: "PCRF_EVAL AND: 2, 7;
APN-Aggregate-Max-Bitrate-DL: "PCRF_EVAL_AVP_NOT_PRESENT:IAVP; or
Guaranteed-Bitrate-UL: "PCRF_EVAL_RANGE: 100, 200"

Figure 5:
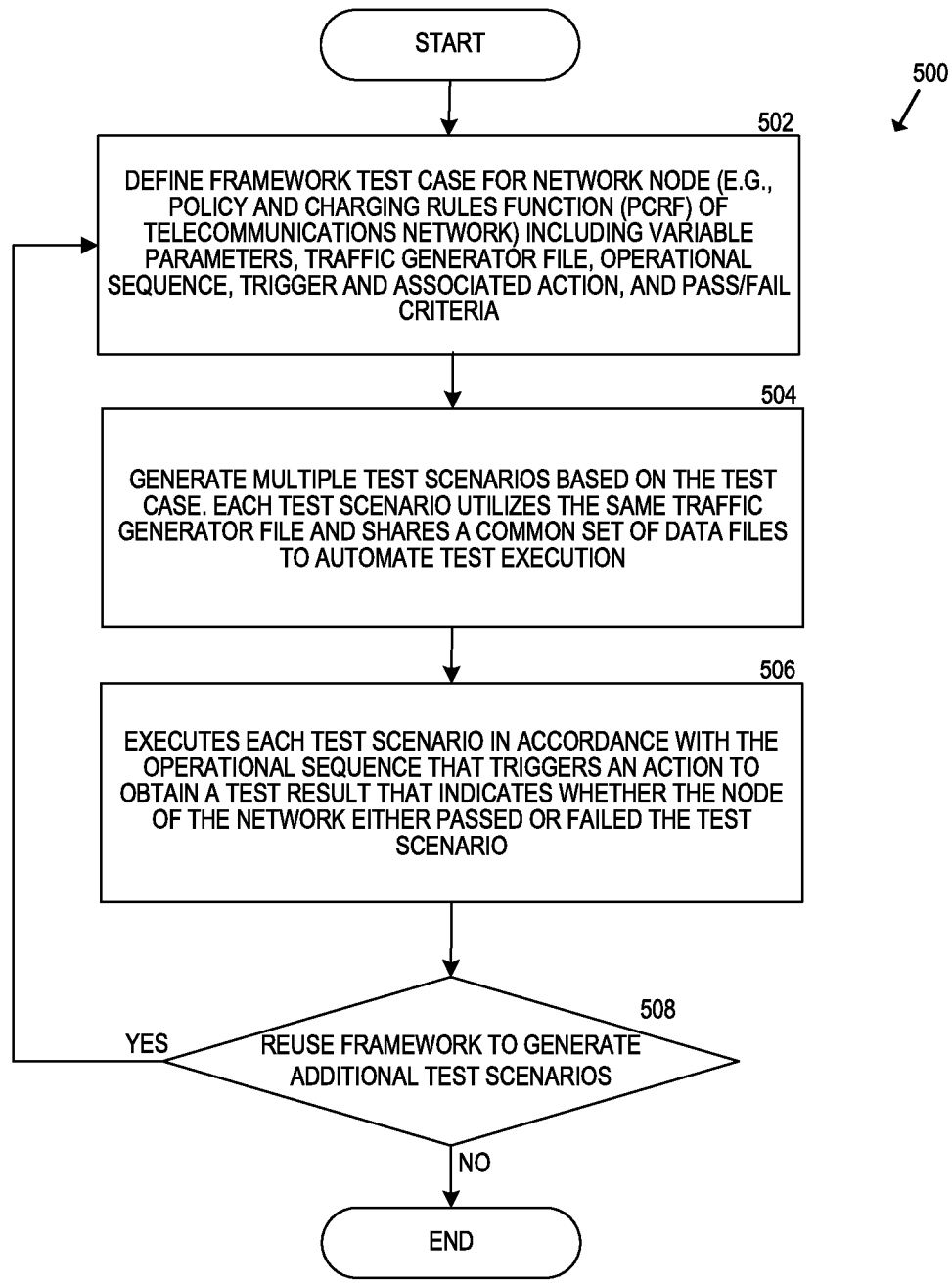
FIG. 5 is a flowchart that illustrates a process of an automation framework.

FIG. 5 is a flowchart that illustrates a process of an automation framework to orchestrate the execution of multiple test scenarios. The method 500 can test the multiple scenarios of a common test case for a node of a network such as a policy and charging rules function (PCRF) of a telecommunications node. A framework logic manages setup, execution, and analysis of test scenarios.

In 502, the automation framework defines a test case for the node of the network. The test case includes multiple values for multiple variable parameters. In some embodiments, the multiple variable parameters include an access point name (APN), a user device, and a geographic location of the user device. The test case also has a traffic generator file, and defines an operational sequence, trigger and associated action, and pass/fail criteria. In some embodiments, the traffic generator is a Diameter protocol traffic generator. For example, the traffic generator can be a Seagull multi-protocol traffic generator.

In 504, the automation framework generates multiple test scenarios based on the test case. The multiple test scenarios each utilize the same traffic generator file(s) and share a common set of data files to automate test execution. For example, the automation framework can generate any test scenario by reconfiguring the test case or a previous test scenario to reuse the Seagull traffic generator file and any of the operational sequence, the trigger and associated action, a variable parameter, and pass/fail criterion. For example, a first test scenario can have a first set of values and a second test scenario can have a second set of values different from the first. In another example, all test scenarios share the same variables, but their corresponding values vary for different test scenarios. In yet another example, all test scenarios share the same variable parameters and share only some of the corresponding values. In some embodiments, each test scenario includes a different combination of a set of values for the variable parameters.

Therefore, the variable parameters of a test case can be reused to automate subsequent test scenarios. For example, a first test scenario can test a first type of smartphone (e.g., ANDROID) coupled to the network and a second test scenario tests a second type of smartphone (e.g., IPHONE). Accordingly, the test scenarios can have different combinations of access point names, user devices, geographic locations of the user devices, etc.

In 506, the automation framework executes each test scenario in accordance with the operational sequence that triggers actions to obtain a test result that indicates whether the node of the network either passed or failed the test scenario. For example, the operational sequence may include a command to clear all data, provision resources in accordance with a subscription plan, start a trace for a subscriber, execute a test scenario, and then gather trace and log data. In some embodiments, the automation framework can report out results data based on the executed test scenario(s).

A test scenario can execute a trace for a subscriber of the network, execute a log file to record test activity, and then gather trace data and log data to determine whether the test scenario passed or failed. For example, a triggered action can reflect a change in a users subscription. A triggering event can include a NAP provisioning event, an LDAP event, an SSH command event, or a SOAP command that are configured to execute before or during a test scenario execution. The automation framework can include pass/fail criteria that defines an expected output based on a known input. A test scenario passes when the actual output of the test scenario matches the expected output. Moreover, the test scenario fails when the actual output does not match the expected output.

In 508, any subsequent test scenario is automated because it reuses at least some of the same data files and variables of a prior test scenario by running on the automation framework. For example, the Seagull files, operational sequence, and/or triggers and associated actions can be reused for subsequent test scenarios. In one example, only the APN parameter value and pass/fail criteria are changed for the different test scenarios. Hence, the automation framework automates the test flow while giving flexibility to, for example, change a parameter and pass/fail criteria for individual test scenarios.

In some embodiments, the automation framework can control two separate test scenarios running in tandem. One test scenario can notify the other test scenario to continue with its Diameter message. For example, the automation framework can be used for Gx and Rx message sequencing in PCRF automation. In another example, test scenarios can generate a VoLTE call sequence where two separate scenario files tie scenarios together such that instances of Seagull files can run one after the other. The disclosed automation framework also allows for testing interactions with other network nodes. In contrast, existing systems cannot test across nodes, allow defining pass/fail criteria, tie everything together to simulate other nodes or include a common architecture to test other types of nodes.

Figure 6:
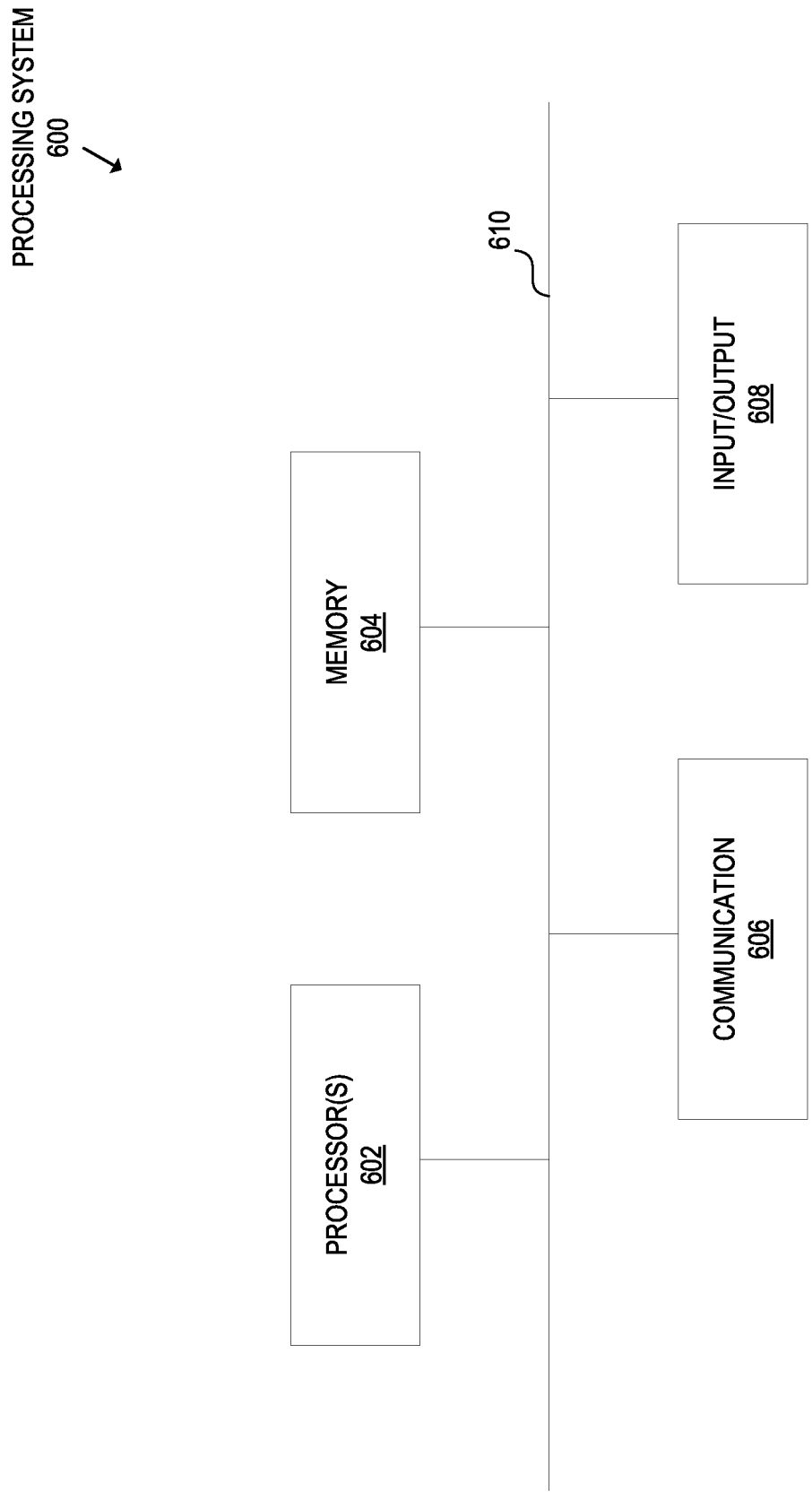
FIG. 6 is a block diagram that illustrates an example processing system in which aspects of the disclosed technology can be embodied.

FIG. 6 is a block diagram illustrating an example of a processing system 600 in which at least some operations described herein can be implemented. The processing system 600 represents a system that can run any of the methods/algorithms described herein. For example, any network access device (e.g., user device) of an EPC network can include or be part of a processing system 600. The processing system 600 can include one or more processing devices, which can be coupled to each other via a network or multiple networks. A network can be referred to as a communication network or telecommunications network.

In the illustrated embodiment, the processing system 600 includes one or more processors 602, memory 604, a communication device 606, and one or more input/output (I/O) devices 608, all coupled to each other through an interconnect 610. The interconnect 610 can be or include one or more conductive traces, buses, point-to-point connections, controllers, adapters and/or other conventional connection devices. Each of the processor(s) 602 can be or include, for example, one or more general-purpose programmable microprocessors or microprocessor cores, microcontrollers, application specific integrated circuits (ASICs), programmable gate arrays, or the like, or a combination of such devices.

The processor(s) 602 control the overall operation of the processing system 600. Memory 604 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 604 can store data and instructions that configure the processor(s) 602 to execute operations in accordance with the techniques described above. The communication device 606 can be or include, for example, an Ethernet adapter, cable modem, Wi-Fi adapter, cellular transceiver, Bluetooth transceiver, or the like, or a combination thereof. Depending on the specific nature and purpose of the processing system 600, the I/O devices 608 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks may be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. At least one non-transitory computer-readable medium carrying instructions, which, when executed by at least one data processor of a system, executes the instructions to automate multiple test scenarios for a node of a telecommunications network, execution of the instructions causes the system to:
define a test case for the node of the telecommunications network, wherein the test case includes multiple values for multiple variable parameters,
wherein the multiple variable parameters include an access point name (APN), a user device, and a geographic location of the user device, and wherein the test case includes a test sequence, a trigger and a trigger action, and a pass/fail criterion;
generate at least one test scenario based on the test case, wherein the test scenario utilizes a common traffic generator file and shares a common set of data files to automate test execution; and
execute the test scenario, in accordance with the test sequence or based on the trigger action when detecting the trigger, to obtain a test result for the node of the telecommunications network based on the test scenario or the trigger and trigger action.

2. The at least one non-transitory computer-readable medium of claim 1:
wherein executing the test scenario causes the system to:
execute a trace of a user device that accesses the telecommunications network;
execute a log file to record test activity of the user device; and
gather trace data and log data from the log file to determine whether the test scenario passed or failed.

3. The at least one non-transitory computer-readable medium of claim 1, wherein the common traffic generator file includes a multi-protocol traffic generator file.

4. The at least one non-transitory computer-readable medium of claim 1, wherein a first test scenario has a first set of the multiple values and a second test scenario has a second set of the multiple values, and wherein at least some of the second set of the multiple values are different from the first set of the multiple values.

5. The at least one non-transitory computer-readable medium of claim 1, wherein executing the test scenario includes causing the system to:

execute in tandem a first test scenario and a second test scenario.

6. The at least one non-transitory computer-readable medium of claim 1, wherein executing the test scenario includes causing the system to:
 execute a second test scenario immediately after executing a first test scenario,
 wherein the first test scenario and the second test scenario are included in a sequence.

7. The at least one non-transitory computer-readable medium of claim 1, wherein executing the test scenario includes causing the system to:
 override at least one of the multiple variable parameters or at least one of the multiple values for the multiple variable parameters.

8. A system for automated execution of test scenarios for a component or entity of a telecommunications network, the system comprising:
 at least one memory of an automation framework that stores a common traffic generator file, multiple parameters that include an access point name, a user device, and a geographic location, a test sequence, a trigger and trigger action, pass/fail criteria, and instructions including framework logic for managing multiple test executions of different scenarios; and
 at least one hardware processor of the automation framework configured to determine whether a scenario either passed or failed a test scenario depending on whether an actual test result matches an expected test result, where execution of the instructions causes the system to:
 derive a set of test scenarios based on a common test case,
 wherein each test scenario in the set of the test scenarios defines a different one of the access point name, the user device, or the geographic location for the multiple parameters,
 wherein the each test scenario in the set of the scenarios operates in accordance with the test sequence to execute the trigger action when detecting the trigger, and
 wherein the each test scenario in the set of the scenarios utilizes the common traffic generator file and shares a common set of data files to orchestrate test execution; and
 determine a test result for the each test scenario in the set of the scenarios.

9. The system of claim 8, wherein the component or entity includes a node of the telecommunications network, and wherein execution of the instructions further causes the system to:
 execute a trace of a user device that accesses the telecommunications network;
 execute a log file to record test activity of the user device; and
 gather trace data and log data from the log file to determine whether each of the test scenarios passed or failed.

10. The system of claim 8, wherein the common traffic generator file includes a multi-protocol traffic generator file.

11. The system of claim 8, wherein a first test scenario of the set of test scenarios has a first set of the multiple parameters and a second test scenario of the set of test scenarios has a second set of the multiple parameters, and wherein at least some of the second set of the multiple parameters are different from the first set of the multiple parameters.

12. The system of claim 8, wherein execution of the instructions further causes the system to:
 execute in tandem a first test scenario of the set of test scenarios and a second test scenario of the set of test scenarios.

13. The system of claim 8, wherein execution of the instructions further causes the system to:
 execute a second test scenario immediately after executing a first test scenario,
 wherein the first test scenario and the second test scenario are included in a sequence.

14. The system of claim 8, wherein at least one of the test scenarios of the set of test scenarios includes overriding at least one of the multiple parameters.

15. A method for automated execution of test scenarios for a component or entity of a telecommunications network, the method comprising:
 defining, by a processor, a test case for an entity or component of the telecommunications network,
 wherein the test case includes values for multiple variable parameters,
 wherein the multiple variable parameters include an access point name (APN), a user device, and a geographic location of the user device, and
 wherein the test case includes a test sequence, a trigger and a trigger action, and a pass/fail criterion;
 generating, by the processor, at least one test scenario based on the test case, wherein the test scenario utilizes a common traffic generator file and shares a common set of data files to automate test execution; and
 executing the test scenario, by the processor, in accordance with the test sequence or based on the trigger action when detecting the trigger, to obtain a test result for the component or entity of the telecommunications network based on the test scenario or the trigger and trigger action.

16. The method of claim 15, wherein the common traffic generator file includes a multi-protocol traffic generator file and wherein the component or entity includes a node of the telecommunications network.

17. The method of claim 15, wherein a first test scenario has a first set of the multiple values and a second test scenario has a second set of the multiple values, and wherein at least some of the second set of the multiple values are different from the first set of the multiple values.

18. The method of claim 15, wherein executing the test scenario comprises: executing in tandem a first test scenario and a second test scenario.

19. The method of claim 15, wherein executing the test scenario includes executing a second test scenario immediately after executing a first test scenario, wherein the first test scenario and the second test scenario are included in a sequence.

20. The method of claim 15, wherein executing the test scenario comprises:
 overriding at least one of the multiple variable parameters or at least one of the multiple values for the multiple variable parameters.

* * * * *